US008867923B2

(12) United States Patent
Noda

(10) Patent No.: US 8,867,923 B2
(45) Date of Patent: Oct. 21, 2014

(54) TRANSPONDER, REPEATER, AND TERMINAL EQUIPMENT

(75) Inventor: Kenta Noda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 169 days.

(21) Appl. No.: 13/457,684

(22) Filed: Apr. 27, 2012

(65) Prior Publication Data
US 2012/0294605 A1 Nov. 22, 2012

(30) Foreign Application Priority Data

May 16, 2011 (JP) ................................. 2011-109207

(51) Int. Cl.
H04B 10/00 (2013.01)
H04Q 3/00 (2006.01)
H04L 12/26 (2006.01)
H04L 12/24 (2006.01)

(52) U.S. Cl.
CPC .......... *H04L 43/0811* (2013.01); *H04Q 3/0062* (2013.01); *H04Q 2213/1301* (2013.01); *H04L 41/06* (2013.01); *H04L 12/2636* (2013.01)
USPC ................................. 398/177; 398/17; 398/37

(58) Field of Classification Search
USPC .......................................................... 398/173
See application file for complete search history.

(56) References Cited

U.S. PATENT DOCUMENTS

| 7,526,199 | B2 * | 4/2009 | Sekine et al. | 398/33 |
|---|---|---|---|---|
| 7,941,049 | B2 * | 5/2011 | Nakano et al. | 398/92 |
| 8,023,819 | B2 * | 9/2011 | Jensen | 398/56 |
| 8,351,797 | B2 * | 1/2013 | Nakashima et al. | 398/177 |
| 2002/0131099 | A1 * | 9/2002 | Harasawa | 359/110 |
| 2002/0154358 | A1 * | 10/2002 | Hino | 359/124 |
| 2003/0081295 | A1 * | 5/2003 | Kamura | 359/174 |
| 2003/0147585 | A1 * | 8/2003 | Kikuchi et al. | 385/24 |
| 2006/0018659 | A1 * | 1/2006 | Sekine et al. | 398/79 |
| 2008/0170852 | A1 * | 7/2008 | Santoro et al. | 398/15 |
| 2008/0175587 | A1 * | 7/2008 | Jensen | 398/2 |
| 2009/0324240 | A1 * | 12/2009 | Ishiguro | 398/141 |
| 2010/0209116 | A1 * | 8/2010 | Noda | 398/165 |
| 2011/0085798 | A1 * | 4/2011 | Kikuchi | 398/34 |
| 2011/0097077 | A1 * | 4/2011 | Suzuki et al. | 398/5 |
| 2011/0243558 | A1 * | 10/2011 | Iizawa et al. | 398/48 |
| 2012/0230671 | A1 * | 9/2012 | Nakada et al. | 398/1 |
| 2012/0230674 | A1 * | 9/2012 | Yuan et al. | 398/17 |

(Continued)

FOREIGN PATENT DOCUMENTS

JP 2010-081223 A 4/2010

*Primary Examiner* — Ken Vanderpuye
*Assistant Examiner* — Amritbir Sandhu
(74) *Attorney, Agent, or Firm* — Volpe and Koenig, P.C.

(57) ABSTRACT

A transponder for performing bidirectional conversion between a client-side signal used for communication to a client device and a transmission path-side signal used for communication to a transmission path, the transponder comprising: a client-side interface for inputting/outputting the client-side signal; a transmission path-side interface for inputting/outputting the transmission path-side signal; a connection determining unit for determining which of the another client-side interface and the client device is coupled to the client-side interface; and a transmission signal generating unit for outputting, in a case where a state signal indicating a state on a transmission path side is input to the transmission path-side interface, a transmission signal indicating that the state signal has been input, from the client-side interface, wherein: the transmission signal generating unit changes a form of the transmission signal to be output from the client-side interface, based on a determination result obtained by the connection determining unit.

12 Claims, 12 Drawing Sheets

(56) References Cited

U.S. PATENT DOCUMENTS

2012/0237203 A1* 9/2012 Fujimori .................. 398/20
2012/0294605 A1* 11/2012 Noda ....................... 398/11
2013/0322867 A1* 12/2013 Ibach et al. ................ 398/2

* cited by examiner

TRANSPONDER, REPEATER, AND TERMINAL EQUIPMENT

CLAIM OF PRIORITY

The present application claims priority from Japanese patent application JP 2011-109207 filed on May 16, 2011, the content of which is hereby incorporated by reference into this application.

BACKGROUND OF THE INVENTION

This invention relates to a transponder that performs bidirectional conversion between a client-side signal and a transmission path-side signal, and more particularly, to a transponder that determines a connection destination of an interface at which the client-side signal is input/output.

In a transmission system (optical transmission system) in which a client device and another client device opposed to the client device are connected to each other through a transmission path, it is necessary to notify the client device of the occurrence of a failure when the failure has occurred in the transmission path or the like.

As one known example, the transmission system includes two terminal equipments connected to two client devices, and the terminal equipments are connected to each other through a transmission path. The terminal equipment includes one transponder that performs bidirectional conversion between a client-side signal used for communication to the client device and a transmission path-side signal used for communication to the transmission path. When a signal is output from the client device, the transponder of the terminal equipment connected to the client device converts a client-side signal into a transmission path-side signal and outputs the converted signal to the transmission path side. On the other hand, when a signal is input to the client device, the transponder converts a transmission path-side signal into a client-side signal and inputs the converted signal to the client device.

Further, one transmission path has a fixed length, and hence, the length of the transmission path can be enlarged by providing at least one repeater between two terminal equipments. This is because two transmission paths are connected to one repeater. The repeater includes two transponders. One of the transponders converts a transmission path-side signal into a client-side signal, and the other converts a client-side signal output from one transponder into a transmission path-side signal.

The transponder includes a client-side interface connected to the client device or the other transponder and a transmission path-side interface connected to the transmission path. The client-side interface of the transponder provided in the terminal equipment is connected to the client device, and the transmission path-side interface is connected to the transmission path. The client-side interface provided in the repeater is connected to the other transponder, and the transmission path-side interface is connected to the transmission path.

In the following description, the terminal equipment and the repeater are sometimes collectively referred to "communication device".

As a system of notifying the client device of the occurrence of a failure in the above-mentioned transmission system, there are known a system in which failure information indicating the occurrence of a failure is included in an overhead part of a light signal and a system in which a frame for transferring the failure information is generated and the frame is transferred to the client device.

For example, in the case of the former system, in a synchronous digital hierarchy (SDH) system, a signal called an alarm indication signal (AIS) is included in a frame of a transmission signal flowing through the transmission path, and thus, failure information is transferred to the client device.

Further, in the case of the latter system, in an Ethernet system of the 10-Gigabit Ethernet, a failure transfer function called link fault signaling (LFS) is standardized.

However, in order for a communication device to detect the failure information, it is necessary to decode a light signal at high speed to read a warning signal. Therefore, there is a problem in that the cost for the communication device rises.

In order to lower the cost for the communication device, the following method is known. When a failure has occurred, the output of a light signal is stopped at a client-side interface of a transponder to notify a client device of the occurrence of the failure, and a client loss of signal (LOS) signal that notifies the client device of the occurrence of the failure is output through use of an Ether-OAM signal at a transmission path-side interface (for example, see Japanese Patent Application Laid-open No. 2010-81223).

This method is described with reference to FIGS. 10 to 12.

FIG. 10 is an explanatory diagram of a failure notification method in the case where a failure has occurred in a transmission path in a conventional example.

A transmission system includes a client device 100, a terminal equipment 200, a terminal equipment 500, and a client device 600. The terminal equipments 200 and 500 are connected to each other through a transmission path 440.

The terminal equipment 200 includes a transponder 420 and an optical multiplexer 430. The transponder 420 converts a client-side signal from the client device 100 into a transmission path-side signal. The optical multiplexer 430 multiplexes the transmission path-side signal from the transponder 420 and outputs the resultant signal to the transmission path 440 side.

The terminal equipment 500 includes a transponder 460 and an optical de-multiplexer 450. The optical de-multiplexer 450 de-multiplexes the transmission path-side signal from the transmission path 440 and outputs the resultant signal to the transponder 460. The transponder 460 converts the transmission path-side signal output from the optical de-multiplexer 450 into a client-side signal and outputs the converted client-side signal to the client device 600.

It is assumed that a failure such as the disconnection of an optical fiber has occurred in the transmission path 440 (51). In this case, a light signal does not reach a downstream side from a place where the failure has occurred. Therefore, the transponder 460 provided in the terminal equipment 500 detects an LOS (52) and stops the output from the client-side interface connected to the client device 600 (53). The client device 600 detects the LOS (54) and can detect that some failure has occurred in the transmission system.

FIG. 11 is an explanatory diagram of a failure notification method in the case where a failure has occurred between the client device 100 and the terminal equipment 200 in the conventional example.

The configuration of the transmission system illustrated in FIG. 11 is the same as that of the transmission system illustrated in FIG. 10, and hence, the description thereof is omitted.

When a failure such as the disconnection of an optical fiber has occurred between the client device 100 and the terminal equipment 200 (51), a light signal does not reach a downstream side from a place where the failure has occurred. Therefore, the transponder 420 provided in the terminal equipment 200 detects an LOS (52) and outputs a client LOS signal from the transmission path-side interface to the downstream side (55).

When the client LOS signal from the transponder 420 is input to the transponder 460, the transponder 460 stops the output from the client-side interface connected to the client device 600 (53). The client device 600 detects the LOS (54) and can detect that some failure has occurred in the transmission system.

FIG. 12 is an explanatory diagram of a failure notification method in a multi-stage transmission system of the conventional example.

A transmission system illustrated in FIG. 12 is a multi-stage transmission system which includes two repeaters 300 and 400 (hereinafter, collectively referred to as "repeater 300") and in which a transmission path is extended. It should be noted that the transmission system including at least one repeater 300 is called a multi-stage transmission system.

Client devices 100 and 600 illustrated in FIG. 12 are the same as the client devices 100 and 600 illustrated in FIG. 10, and terminal equipments 200 and 500 illustrated in FIG. 12 are the same as the terminal equipments 200 and 500 illustrated in FIG. 10, and hence, the descriptions thereof are omitted.

The repeater 300 includes an optical de-multiplexer 640, a transponder 650, a transponder 660, and an optical multiplexer 670.

The optical de-multiplexer 640 is the same as the optical de-multiplexer 450 provided in the terminal equipment 500 illustrated in FIG. 10, and the optical multiplexer 670 is the same as the optical multiplexer 430 provided in the terminal equipment 200 illustrated in FIG. 10, and hence, the descriptions thereof are omitted.

A transmission path-side interface of the transponder 650 is connected to the optical de-multiplexer 640 and a client-side interface of the transponder 650 is connected to the transponder 660. The transponder 650 converts a transmission path-side signal into a client-side signal.

A transmission path-side interface of the transponder 660 is connected to the optical de-multiplexer 670 and a client-side interface of the transponder 660 is connected to the transponder 650. The transponder 660 converts a client-side signal into a transmission path-side signal.

The configuration of the repeater 400 is the same as that of the repeater 300, and hence, the description thereof is omitted.

When a failure such as the disconnection of an optical fiber has occurred between the client device 100 and the terminal equipment 200 (810), a light signal does not reach a downstream side from a place where the failure has occurred. Therefore, the transponder 420 provided in the terminal equipment 200 detects an LOS (820) and outputs a client LOS signal from the transmission path-side interface (830).

When the client LOS signal is input to the transponder 650 provided in the repeater 300, the transponder 650 stops the output of the client-side interface (840).

The transponder 660 detects the LOS based on the stop of the output from the client-side interface by the transponder 650 (850), and outputs a client LOS signal from the transmission path-side interface (860).

When the client LOS signal is input to the transponder 690 provided in the repeater 400, the transponder 690 stops the output of the client-side interface (870).

The transponder 700 detects the LOS based on the stop of the output from the client-side interface by the transponder 690 (880), and outputs a client LOS signal from the transmission path-side interface (890).

When the client LOS signal is input to the transponder 450 provided in the terminal equipment 500, the transponder 450 stops the output of the client-side interface (900).

The client device 600 detects the LOS (910) and can detect that some failure has occurred in the transmission system.

In the multi-stage transmission system illustrated in FIG. 12, an output to a client device is stopped so as to notify the client device of the occurrence of a failure from the viewpoint of using the transponders provided in the terminal equipments 200 and 500 and the transponders provided in the repeaters 300 and 400 in common. Therefore, in all the transponders, when a client LOS signal is input to a transmission path-side interface, the output from the client-side interface is stopped.

Therefore, all the transponders connected to the transmission path output client LOS signals in spite of the fact that a failure has occurred at one place of the client-side interface, and hence, it is difficult for a manager to check all the client LOS signals to identify the failure place.

SUMMARY OF THE INVENTION

It is an object of this invention to provide a transponder that allows a manager to easily identify a failure place with the common use of transponders provided in repeaters and terminal equipments.

According to an aspect of the present invention, there is provided a transponder for performing bidirectional conversion between a client-side signal used for communication to a client device and a transmission path-side signal used for communication to a transmission path, the transponder comprising: a client-side interface for inputting/outputting the client-side signal, which is coupled to one of another client-side interface and the client device; a transmission path-side interface for inputting/outputting the transmission path-side signal; a connection determining unit for determining which of the another client-side interface and the client device is coupled to the client-side interface; and a transmission signal generating unit for outputting, in a case where a state signal indicating a state on a transmission path side is input to the transmission path-side interface, a transmission signal indicating that the state signal has been input, from the client-side interface, wherein: the connection determining unit has a recognition signal output unit for outputting, from the client-side interface, a recognition signal for determining that the another client-side interface is coupled to the client-side interface; the connection determining unit determines that the another client interface is coupled to the client-side interface in a case where the recognition signal is input to the client-side interface; and the transmission signal generating unit changes a form of the transmission signal to be output from the client-side interface, based on a determination result obtained by the connection determining unit.

According to a mode of this invention, it can be provided that a transponder allows a manager to easily identify a failure place with the common use of transponders provided in repeaters and terminal equipments.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

Hereinafter, an embodiment of this invention is described with reference to FIGS. 1 to 9.

Figure 1:
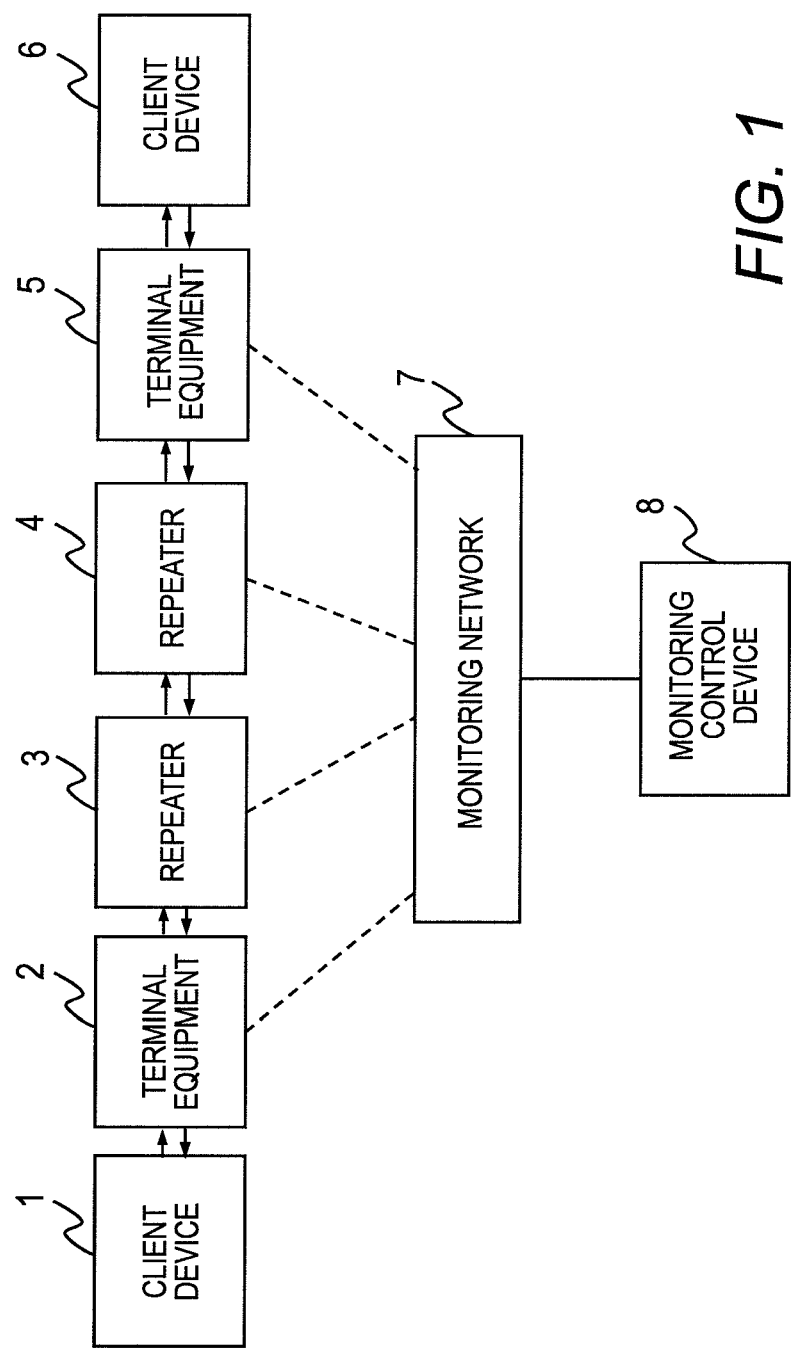
FIG. 1 is a diagram illustrating a configuration of a transmission system according to an embodiment of this invention.

FIG. 1 is a diagram illustrating a configuration of a transmission system according to the embodiment of this invention.

The transmission system includes client devices 1 and 6, terminal equipments 2 and 5, and repeaters 3 and 4, and connects the client device 1 and the client device 6 which are placed at two points at a distance.

A signal from the client device 1 to the client device 6 is transmitted from the client device 1 to the client device 6 via the terminal equipment 2, the repeater 3, the repeater 4, and the terminal equipment 5. A signal from the client device 6 is transmitted to the client device 1 in the same way.

Further, the terminal equipments 2 and 5 and the repeaters 3 and 4 (hereinafter, collectively referred to as "communication device") are connected to a monitoring control device 8 via a monitoring network 7. The communication device outputs a warning signal of a client loss-of-signal (LOS) signal to another communication device and also outputs the warning signal to the monitoring network 7. Therefore, the monitoring control device 8 can monitor the warning signal output from the communication device at real time.

Figure 2:
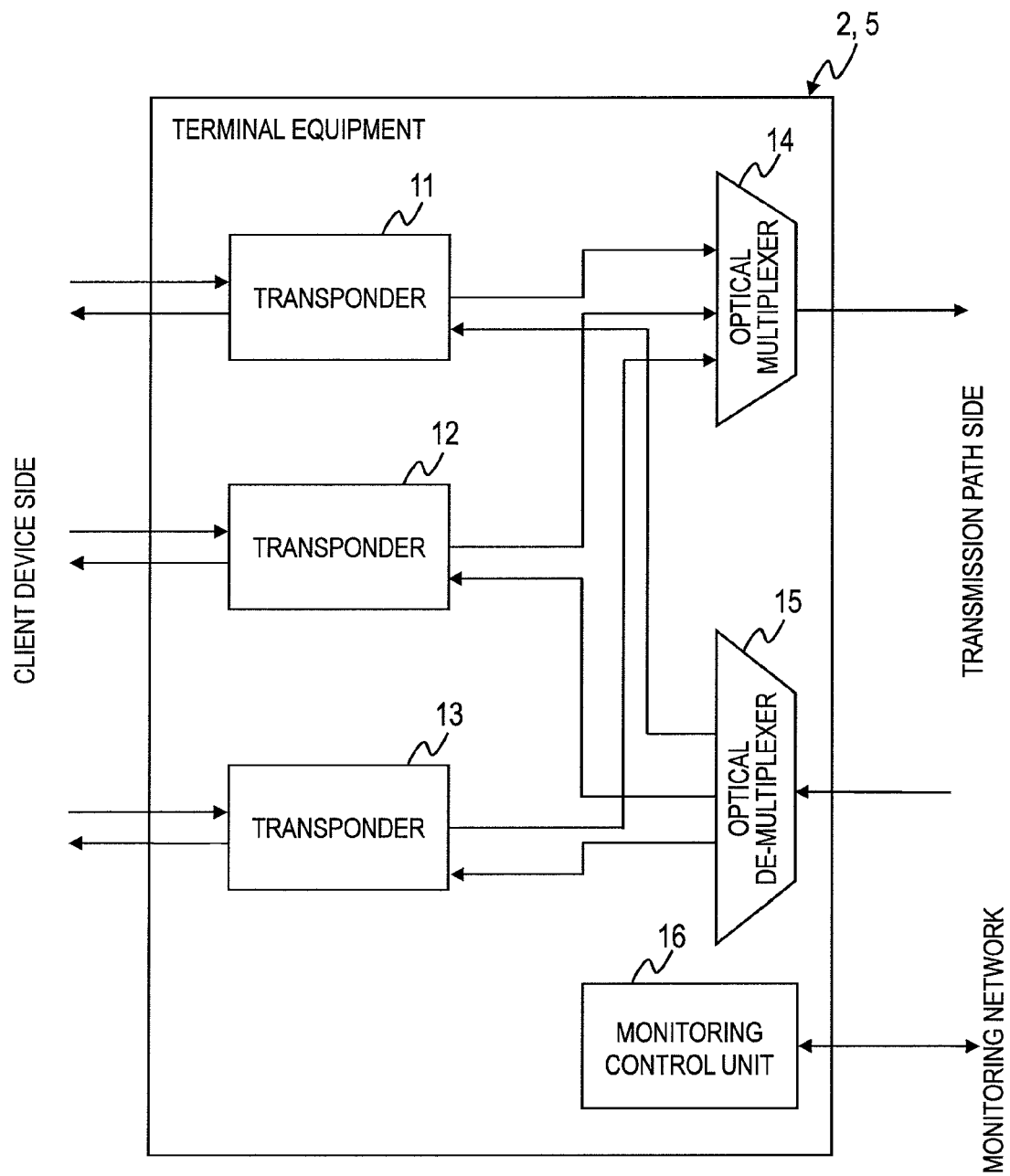
FIG. 2 is a block diagram illustrating a configuration of terminal equipments according to an embodiment of this invention.

FIG. 2 is a block diagram illustrating a configuration of the terminal equipments 2 and 5 according to the embodiment of this invention.

The terminal equipments 2 and 5 (hereinafter, collectively referred to as "terminal equipment") includes transponders 11 to 13 (hereinafter, collectively referred to as "transponder"), an optical multiplexer 14, an optical de-multiplexer 15, and a monitoring control unit 16.

The transponder performs bidirectional conversion between a client-side signal used for communication to the client devices 1 and 6 (hereinafter, collectively referred to as "client device") and a transmission path-side signal used for communication to a transmission path.

Specifically, the transponder converts a client-side signal from the client device into a transmission path-side signal having a predetermined wavelength capable of wavelength multiplexing and outputs the transmission path-side signal to the optical multiplexer 14. In this case, the transponder may add an error-correcting code and data for remote control to the client-side signal before the conversion.

Further, the transponder converts a transmission path-side signal output from the optical de-multiplexer 15 into a client-side signal and outputs the client-side signal to the client device.

The transponder includes a client-side interface for input/output of the client-side signal and a transmission path-side interface for input/output of the transmission path-side signal.

The optical multiplexer 14 multiplexes transmission path-side signals from a plurality of transponders and outputs the multiplexed signals to a transmission path formed of one optical fiber.

The optical de-multiplexer 15 de-multiplexes a signal input from a transmission path and outputs the de-multiplexed signal to the transponder.

The monitoring control unit 16 monitors the optical input/output level, the operation state, and the like of the transponders, the optical multiplexer 14, and the optical de-multiplexer 15 provided in the terminal equipment, and sends an LOS signal to the monitoring network 7 when detecting a failure.

Figure 3:
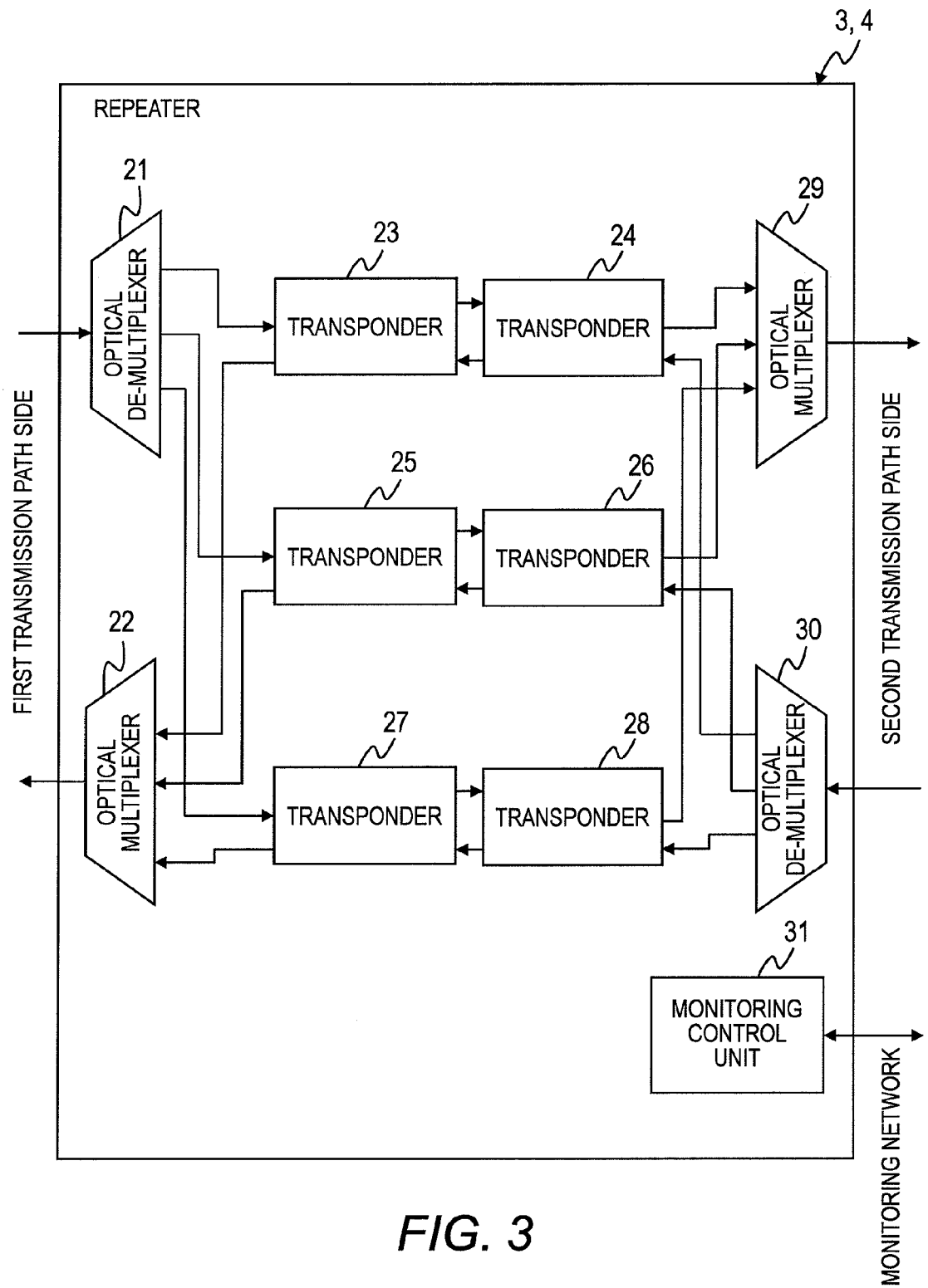
FIG. 3 is a block diagram illustrating a configuration of the repeaters according to an embodiment of this invention.

FIG. 3 is a block diagram illustrating a configuration of the repeaters 3 and 4 according to the embodiment of this invention.

Hereinafter, the repeaters 3 and 4 are collectively referred to as "repeater".

As to the repeater, the following systems are known: a system of using an optical amplifier without converting a signal between a light signal and an electric signal; and a system of using an optical regenerative repeater unit for converting a light signal into an electric signal and thereafter converting the electric signal into a light signal. The repeater of this embodiment is configured by connecting client-side interfaces of two transponders. The connection between the client-side interface of one transponder and the client-side interface of another transponder is referred to as back-to-back connection.

The repeater includes optical de-multiplexers 21 and 30, optical multiplexers 22 and 29, transponders 23 to 28, and a monitoring control unit 31.

Each of the optical de-multiplexers 21 and 30 de-multiplexes a signal input from a transmission path and outputs the de-multiplexed signal to the transponder. The optical de-multiplexer 21 de-multiplexes a signal from a first transmission path, and the optical de-multiplexer 30 de-multiplexes a signal from a second transmission path.

Each of the optical multiplexers 22 and 29 multiplexes signals from a plurality of transponders and outputs the multiplexed signal to a transmission path. The optical multiplexer 22 multiplexes signals from the transponders 23, 25, and 27 and outputs the multiplexed signal to the first transmission path. The optical multiplexer 29 multiplexes signals from the transponders 24, 26, and 28 and outputs the multiplexed signal to the second transmission path.

The client-side interface of the transponder 23 is connected to the client-side interface of the transponder 24.

For example, when a signal is input from the first transmission path side, the signal is de-multiplexed by the optical de-multiplexer 21, and the de-multiplexed signal is input to the transmission path-side interface of the transponder 23. The transponder 23 converts the de-multiplexed signal into a client-side signal and outputs the converted signal from the client-side interface to the transponder 24.

The transponder 24 converts the signal, which has been converted into the client-side signal, into a transmission path-side signal and outputs the converted signal from the transmission path-side interface to the optical multiplexer 29. The optical multiplexer 29 multiplexes the signal from the transponder 24 with the signals from the other transponders 26 and 28 and outputs the multiplexed signal to the second transmission path.

Even when a signal is input to the transponder 24 from the second transmission path, the same signal conversion process is performed. The same applies to the transponders 25 and 26, and the transponders 27 and 28.

The monitoring control unit 31 monitors the optical input/output level, the operation state, and the like of the transponders, the optical multiplexers 22 and 29, and the optical de-multiplexers 21 and 30 provided in the repeater, and sends an LOS signal to the monitoring network 7 when detecting a failure.

Next, the conversion of a signal of this invention is described with reference to FIGS. 4 and 5.

Figure 4:
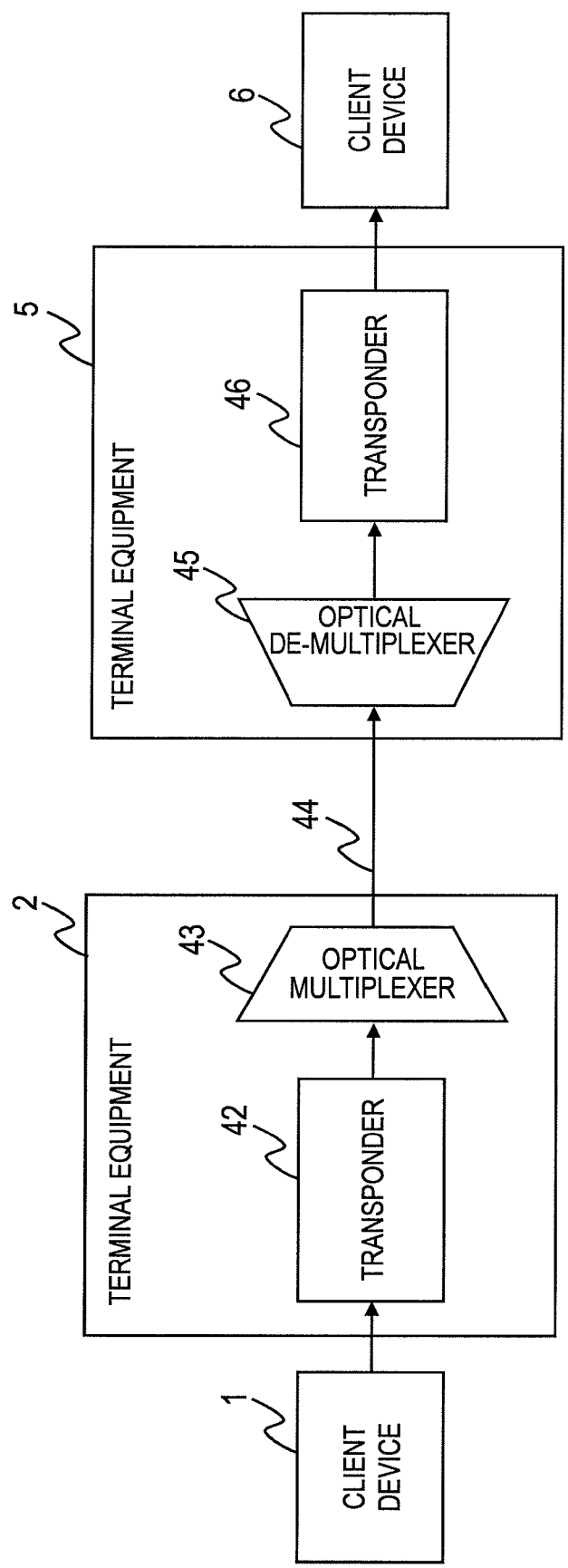
FIG. 4 is an explanatory diagram of the conversion of a signal in a transmission system having no repeaters of an embodiment of this invention.

FIG. 4 is an explanatory diagram of the conversion of a signal in a transmission system having no repeaters of the embodiment of this invention.

In the transmission system illustrated in FIG. 4, the terminal equipments 2 and 5 are connected to each other via a transmission path 44. The client device 1 is connected to the terminal equipment 2, and the client device 6 is connected to the terminal equipment 5.

A signal (client-side signal) from the client device 1 is input to the client-side interface of a transponder 42. The transponder 42 converts the client-side signal input to the client-side interface into a transmission path-side signal and outputs the transmission path-side signal from the transmission path-side interface to an optical multiplexer 43. The optical multiplexer 43 multiplexes the input transmission path-side signal with a transmission path-side signal having another wavelength and outputs the multiplexed signal to a transmission path.

The transmission path-side signal output to the transmission path is input to the optical de-multiplexer 45 provided in the terminal equipment 5. The optical de-multiplexer 45 de-multiplexes the input transmission path-side signal into a predetermined wavelength and outputs the de-multiplexed signal to the transmission path-side interface of a transponder 45.

When the transponder 46 receives the transmission path-side signal from the transmission path-side interface, the transponder 46 converts the input transmission path-side signal into a client-side signal and outputs the client-side signal from the client-side interface to the client device 6.

Figure 5:
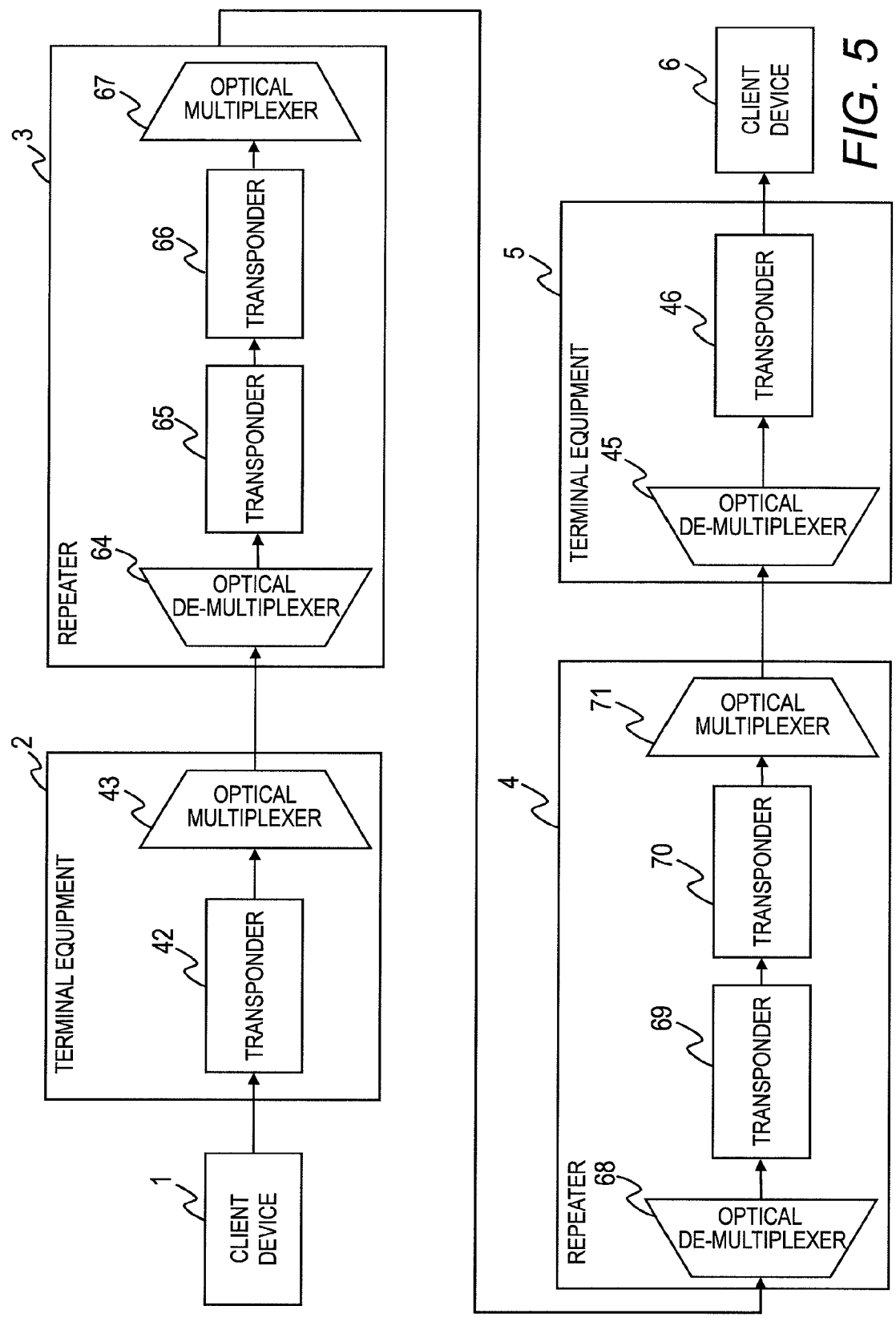
FIG. 5 is an explanatory diagram of a conversion of a signal in a multi-stage transmission system of an embodiment of this invention.

FIG. 5 is an explanatory diagram of the conversion of a signal in a multi-stage transmission system of the embodiment of this invention.

In the multi-stage transmission system illustrated in FIG. 5, two transponders are back-to-back connected to each other in the repeater. When the repeater is configured by back-to-back connecting two transponders, the transponders can be used in common with another communication device, and a transmission path constituting the network that has already been constructed can be extended, as compared with the repeater using an optical amplifier.

In the configuration of the multi-stage transmission system illustrated in FIG. 5, the same configurations as those of the transmission system illustrated in FIG. 4 are denoted by the same reference numerals, and the description thereof is omitted.

The transmission path-side signal output from the optical multiplexer 43 of the terminal equipment 2 is input to an optical de-multiplexer 64 of the repeater 3 via a transmission path.

The optical de-multiplexer 64 de-multiplexes the input transmission path-side signal into a predetermined wavelength and outputs the de-multiplexed signal to the transmission path-side interface of a transponder 65.

The transponder 65 converts the transmission path-side signal input to the transmission path side interface into a client-side signal and outputs the converted client-side signal from the client-side interface to a transponder 66.

The transponder 66 converts the client-side signal input to the client-side interface into a transmission path-side signal and outputs the converted transmission path-side signal from the transmission path-side interface to an optical multiplexer 67.

The optical multiplexer 67 multiplexes the input transmission path-side signal with a transmission path-side signal having another wavelength and outputs the multiplexed signal to a transmission path.

The conversion of a signal in the repeater 4 is the same as that in the repeater 3, and hence, the description thereof is omitted.

Figure 6:
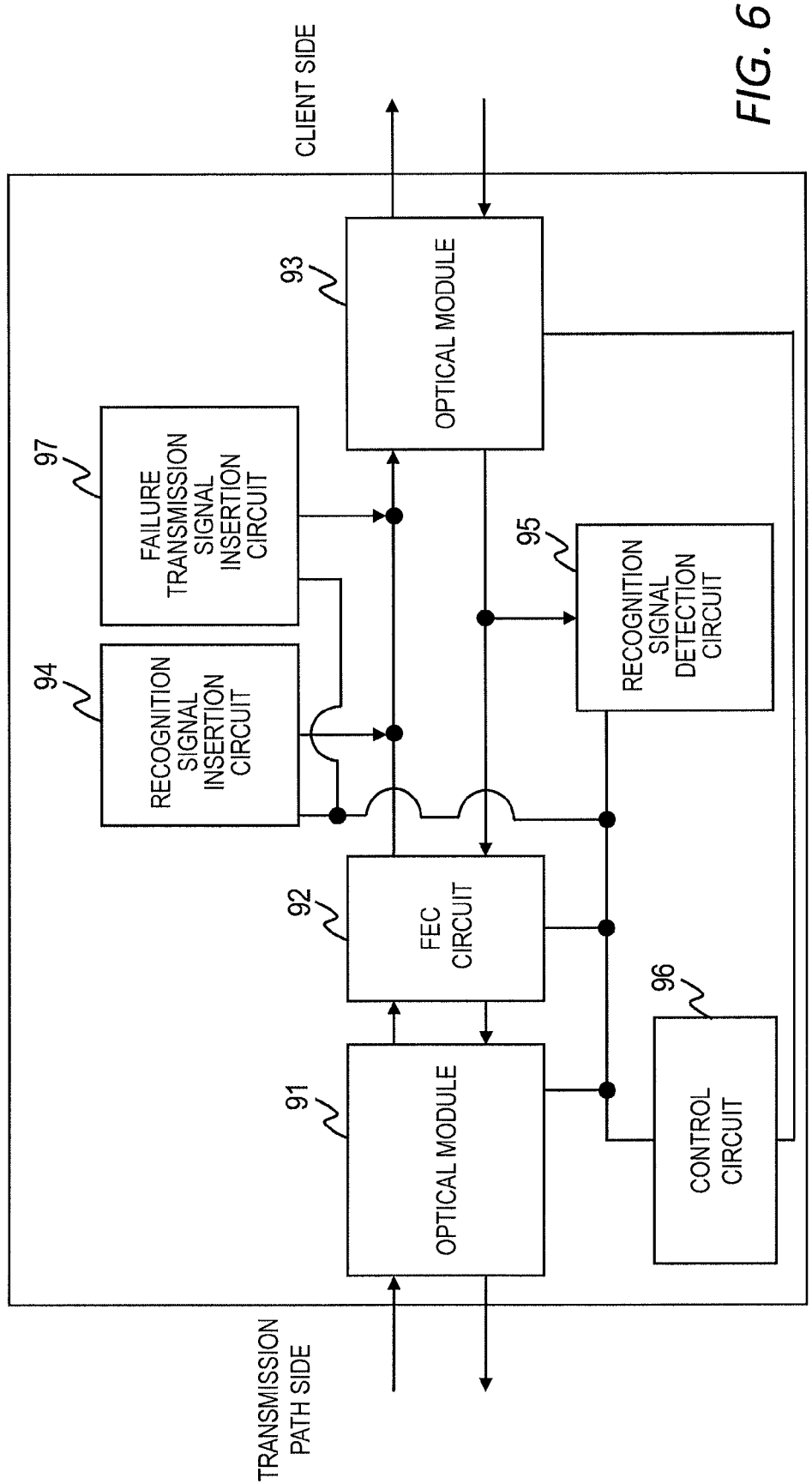
FIG. 6 is a block diagram illustrating a configuration of the transponder according to an embodiment of this invention.

FIG. 6 is a block diagram illustrating the configuration of the transponder according to the embodiment of this invention.

The transponder includes optical modules 91 and 93, a forward error correction (FEC) circuit 92, a recognition signal insertion circuit 94, a recognition signal detection circuit 95, a control circuit 96, and a failure transmission signal insertion circuit 97.

The optical module 91 is connected to the FEC circuit 92, and the FEC circuit 92 is connected to the optical module 93. The recognition signal insertion circuit 94 and the failure transmission signal insertion circuit (transmission signal generating unit) 97 are connected to one of connection lines connecting the FEC circuit 92 to the optical module 93, that is, a connection line for outputting a signal to the optical module 93. Further, the recognition signal detection circuit 95 is connected to another of the connection lines connecting the FEC circuit 92 to the optical module 93, that is, a connection line for outputting a signal to the FEC circuit 92.

The optical module 91 functions as a transmission path-side interface that inputs/outputs a transmission path-side signal, and converts the transmission path-side signal that is a light signal into an electric signal.

The optical module 93 functions as a client-side interface that inputs/outputs a client-side signal, and converts the client-side signal that is a light signal into an electric signal.

The FEC circuit 92 encodes and decodes an error-correcting code (FEC) contained in the transmission path-side signal.

The recognition signal insertion circuit 94 inserts, into a signal, a recognition signal output from the client-side interface.

The recognition signal detection circuit 95 detects the recognition signal from the signal input to the client-side interface. When the recognition signal detection circuit 95 detects the recognition signal from the signal input to the client-side interface, the recognition signal detection circuit 95 notifies the control circuit 96 of the detection of the recognition signal.

Further, the recognition signal detection circuit 95 detects a failure transmission signal from the signal input to the client-side interface. When the recognition signal detection circuit 95 detects the failure transmission signal from the signal input to the client-side interface, the recognition signal detection circuit 95 notifies the control circuit 96 of the detection of the failure transmission signal.

The control circuit 96 controls various circuits. When the control circuit 96 is notified of the detection of the recognition signal from the recognition signal detection circuit 95, the control circuit 96 determines that one client-side interface is connected to another client-side interface (back-to-back connection), and outputs an acknowledge (ACK) signal from the client-side interface.

Further, when the control circuit 96 is notified of the detection of the failure transmission signal from the recognition signal detection circuit 95, the control circuit 96 outputs, from the transmission path-side interface, a client LOS transmission signal indicating that a failure has occurred on an upstream side.

Further, the recognition signal detection circuit 95 and the control circuit 96 in the connection determining unit function as a response signal generating unit for outputting an ACK signal, which is a response signal with respect to the recognition signal, from the client-side interface.

In the case where the connection is determined as back-to-back connection, when the failure transmission signal insertion circuit 97 detects a client LOS signal or a client LOS transmission signal from the transmission path-side interface, the failure transmission signal insertion circuit 97 outputs a failure transmission signal from the client-side interface. On the other hand, in the case where the connection is not determined as back-to-back connection, when the failure transmission signal insertion circuit 97 detects a client LOS signal or a client LOS transmission signal at the transmission path-side interface, the failure transmission signal insertion circuit 97 stops the output of the client-side interface to output the failure transmission signal. The client LOS signal is a signal to be output from the transmission path-side interface when an LOS is detected at the client-side interface.

Thus, a back-to-back connected transponder transmits a transmission signal without stopping the output of the client-side interface even when a failure occurs on an upstream side of the transmission path-side interface of the transponder, and hence, the output of an unnecessary client LOS signal can be prevented.

As described above, when the failure transmission signal insertion circuit 97 detects a client LOS signal or a client LOS transmission signal at the transmission path-side interface, the failure transmission signal insertion circuit 97 can change the form of a failure transmission signal to be output from the client-side interface based on the determination result of the connection determining unit.

Figure 7:
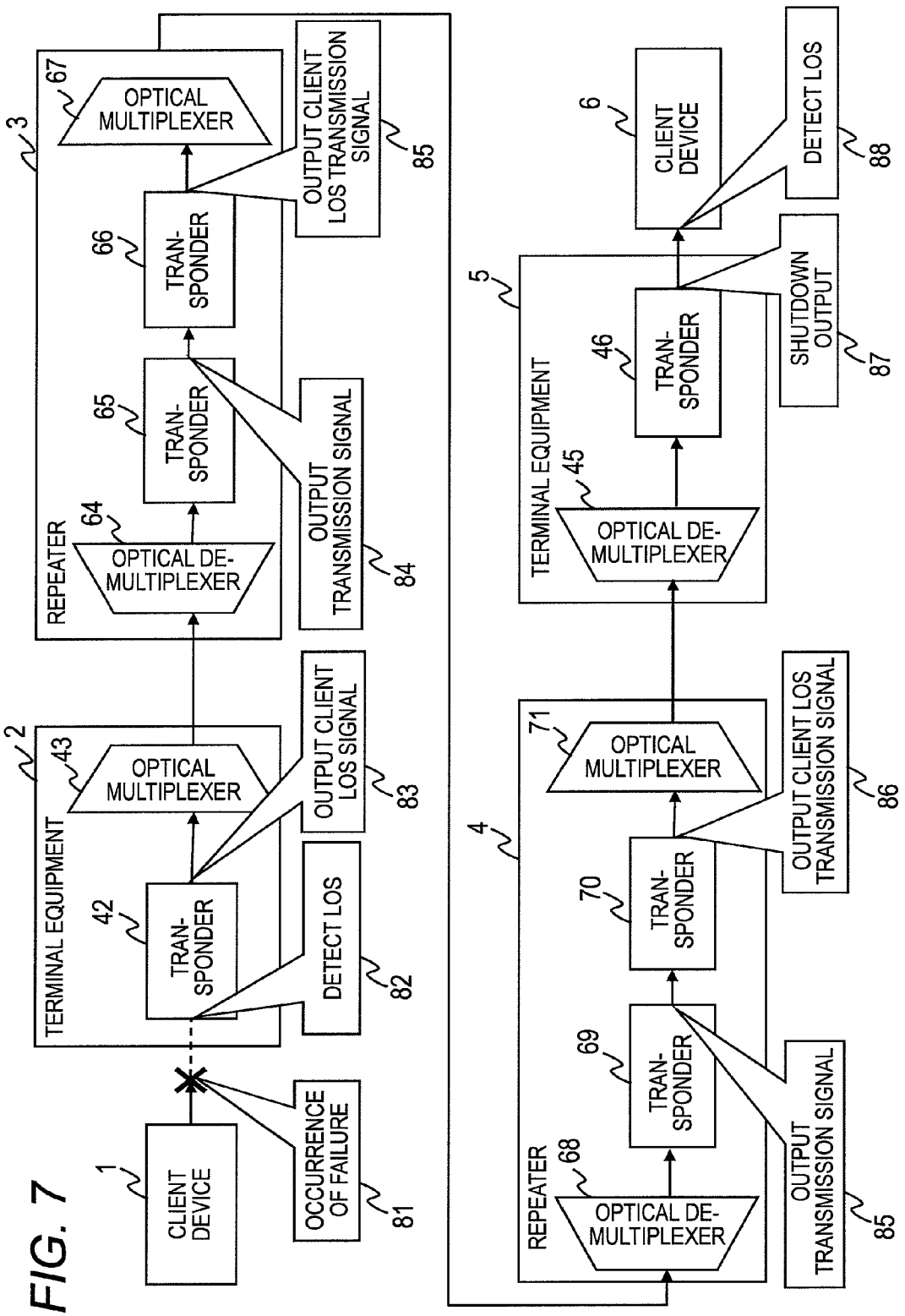
FIG. 7 is an explanatory diagram of a failure notification method in the transmission system according to an embodiment of this invention.

FIG. 7 is an explanatory diagram of a failure notification method in the transmission system of the embodiment of this invention.

The configuration of the transmission system illustrated in FIG. 7 is the same as that of the transmission system illustrated in FIG. 5, and hence, the description thereof is omitted.

When a failure such as the disconnection of an optical fiber occurs between the client device 1 and the terminal equipment 2 (81), the transponder 42 provided in the terminal equipment 2 detects an LOS (82) and outputs a client LOS signal from the transmission path-side interface (83). The client LOS signal is also output to the monitoring network 7 as a warning signal.

Next, when the client LOS signal is input to the transmission path-side interface of the transponder 65 provided in the repeater 3, the transponder 65 outputs a transmission signal from the client-side interface because the transponder 65 is back-to-back connected to the transponder 66 (84).

When the transmission signal is input to the client-side interface of the transponder 66 provided in the repeater 3, the transponder 66 outputs a client LOS transmission signal for notifying the downstream side of the occurrence of the failure from the transmission path-side interface to a transmission path (85). The client LOS transmission signal is not output to the monitoring network 7 as a warning signal.

Next, when the client LOS transmission signal is input to the transmission path-side interface of a transponder 69 provided in the repeater 4, the transponder 69 outputs a transmission signal from the client-side interface because the transponder 69 is back-to-back connected to a transponder 70 (86A).

When the transmission signal is input to the client-side interface of the transponder 70 provided in the repeater 4, the transponder 70 outputs a client LOS transmission signal from the transmission path-side interface to a transmission path (86B).

Next, when the client LOS transmission signal is input to the transmission path-side interface of the transponder 46 provided in the terminal equipment 5, the transponder 46 stops the output of the client-side interface because the transponder 46 is not back-to-back connected (87).

Then, the client device 6 detects an LOS (88) and can detect that some failure has occurred in the transmission system.

Thus, in this embodiment, when a signal (client LOS signal or client LOS transmission signal) indicating the occurrence of a failure is input to the transmission path-side interface of the transponder, the transponder outputs a transmission signal from the client-side interface if the transponder is back-to-back connected. Further, if the transponder is not back-to-back connected, in other words, if the client device is connected to the client-side interface, the transponder stops the output. Therefore, another transponder that is back-to-back connected to the transponder detects an LOS at the client-side interface and can prevent the client LOS signal from being output from the transmission path-side interface.

Accordingly, the manager of the monitoring control device 8 can easily determine that a failure has occurred on the upstream side of a device that has output a client LOS signal.

FIG. 7 illustrates that a failure occurs between the client device 1 and the terminal equipment 2. Next, the case where a failure occurs in a transmission path between the terminal equipment 2 and the repeater 4 is described with reference to FIG. 7.

No signal is input to the transmission path-side interface of the transponder 65 of the repeater 3, and hence, the transponder 65 detects an LOS at the transmission path-side interface. In this case, the transponder 65 stops the output of the client-side interface.

Specifically, the transponder of this embodiment is set so as to stop the output of the client-side interface when detecting an LOS at the transmission path-side interface and so as to output a client LOS signal from the transmission path-side interface when detecting an LOS at the client-side interface.

The output of the client-side interface of the transponder 65 is stopped, and hence, when the transponder 66 detects an LOS at the client-side interface, the transponder 66 outputs a client LOS signal from the transmission path-side interface.

The subsequent processes are the same as those in the case where a failure occurs between the client device 1 and the terminal equipment 2, and hence, the descriptions thereof are omitted.

As described above, even when an LOS is detected at the transmission path-side interface of a transponder, the output of the client-side interface of the transponder is stopped. Therefore, a client LOS signal is output from the transmission path-side interface of another transponder that is back-to-back connected to the transponder. Then, a transponder placed on a downstream side of the transponder that has output the client LOS signal does not output a client LOS signal, and hence, the manager can easily identify a failure point.

Figure 8:
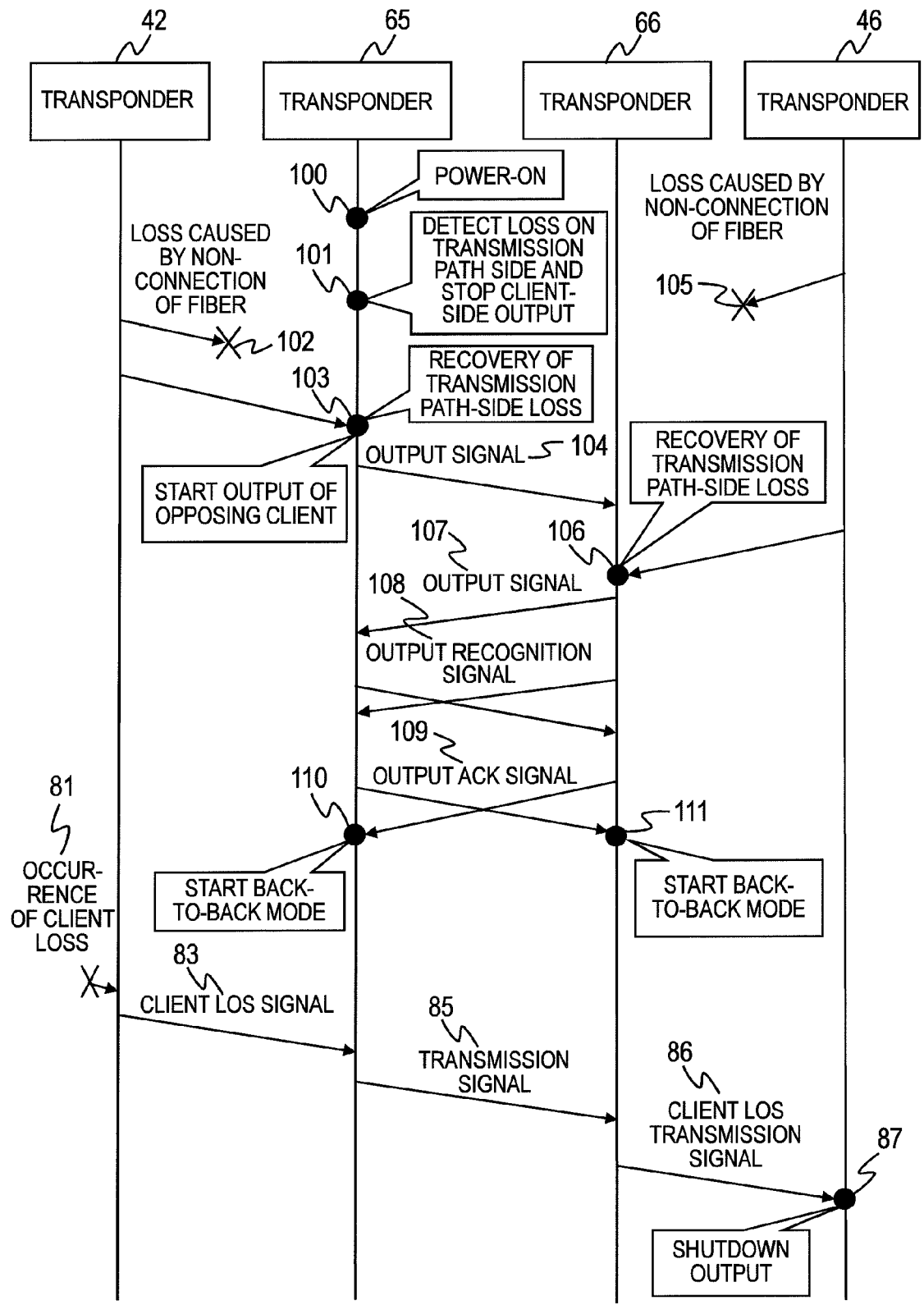
FIG. 8 is a sequence diagram illustrating a sequence until two transponders according to an embodiment of this invention determine back-to-back connection.

FIG. 8 is a sequence diagram illustrating a sequence until two transponders 65 and 66 of the embodiment of this invention determine back-to-back connection.

Each transponder illustrated in FIG. 8 corresponds to each transponder illustrated in FIG. 7. In FIG. 8, the repeater 4 is omitted, and hence, it is assumed that the transponder 46 of the terminal equipment 5 is connected to the transponder 66 provided in the repeater 3.

First, the transponder 65 is powered on (100). In the case where the transmission path-side interface of the transponder 65 is not connected to the transponder 42, nothing is input to the transmission path-side interface of the transponder 65 (102), and hence, the transponder 65 stops the output of the client-side interface (101).

Examples of the case where the transmission path-side interface of the transponder 65 is not connected to the transponder 42 include a case where an optical fiber for connecting the transmission-side interface of the transponder 65 to the transmission path-side interface of the transponder 42 is not connected and a case where the transponder 42 is not powered on.

Next, when the transmission path-side interface of the transponder 42 is connected to the transmission path-side interface of the transponder 65, the transponder 42 outputs a signal from the transmission path-side interface, and when the transponder 65 detects that the signal has been input to the transmission path-side interface, the transponder 65 determines that the transmission path-side interface has been connected to the transponder 42 (103). Then, the transponder 65 outputs a normal signal from the client-side interface (104). Unlike a recognition signal, the normal signal is a signal capable of being detected by the transponder regardless of whether the signal is input to the client-side interface or the transmission path-side interface of the transponder.

In the same way as in the connection between the transponders 42 and 65, when the transponders 46 and 66 are not connected, nothing is input to the transmission path-side interface of the transponder 66 (105), and when a signal is input to the transmission path-side interface of the transponder 66, it is determined that the transponders 46 and 66 have been connected to each other (106). Then, the transponder 66 outputs a normal signal from the client-side interface (107).

The transponders 65 and 66 confirm that a link is established between the client-side interfaces based on the input of the output signal.

Then, one of the transponders outputs a recognition signal from the client-side interface when a normal signal is input from the other transponder to the client-side interface (108). In FIG. 8, the normal signal is input to the transponder 66 prior to the transponder 65, and hence, the transponder 66 outputs a recognition signal first.

When the transponder receives the recognition signal at the client-side interface, the transponder determines that the connection is back-to-back connection, and outputs an ACK signal from the client-side interface (109).

Even when the recognition signal is input to the transmission path-side interface, the recognition signal detection circuit 95 illustrated in FIG. 6 does not detect the recognition signal, and hence, the transponder does not output an ACK signal. This is because the recognition signal is constituted by a special pattern not used for an ordinary signal.

Thus, when the transponders 65 and 66 determine that the connection is back-to-back connection, the transponders 65 and 66 start an operation in a back-to-back mode (110, 111).

On this occasion, when a failure has occurred between the client device 1 and the terminal equipment 2 in the same way as in FIG. 7, the transponder 42 detects that there is no input to the client-side interface, and outputs a client LOS signal from the transmission path-side interface (83).

When the transponder 65 receives the client LOS signal at the transmission path-side interface, the transponder 65 outputs a transmission signal from the client-side interface because the transponders 65 and 66 are back-to-back connected (84).

When the transponder 66 receives the transmission signal at the client-side interface, the transponder 66 outputs a client LOS transmission signal from the transmission path-side interface (85).

When the transponder 46 receives the client LOS signal at the transmission path-side interface, the transponder 46 stops the output of the client-side interface because the transponder 46 is not back-to-back connected (87).

Figure 9:
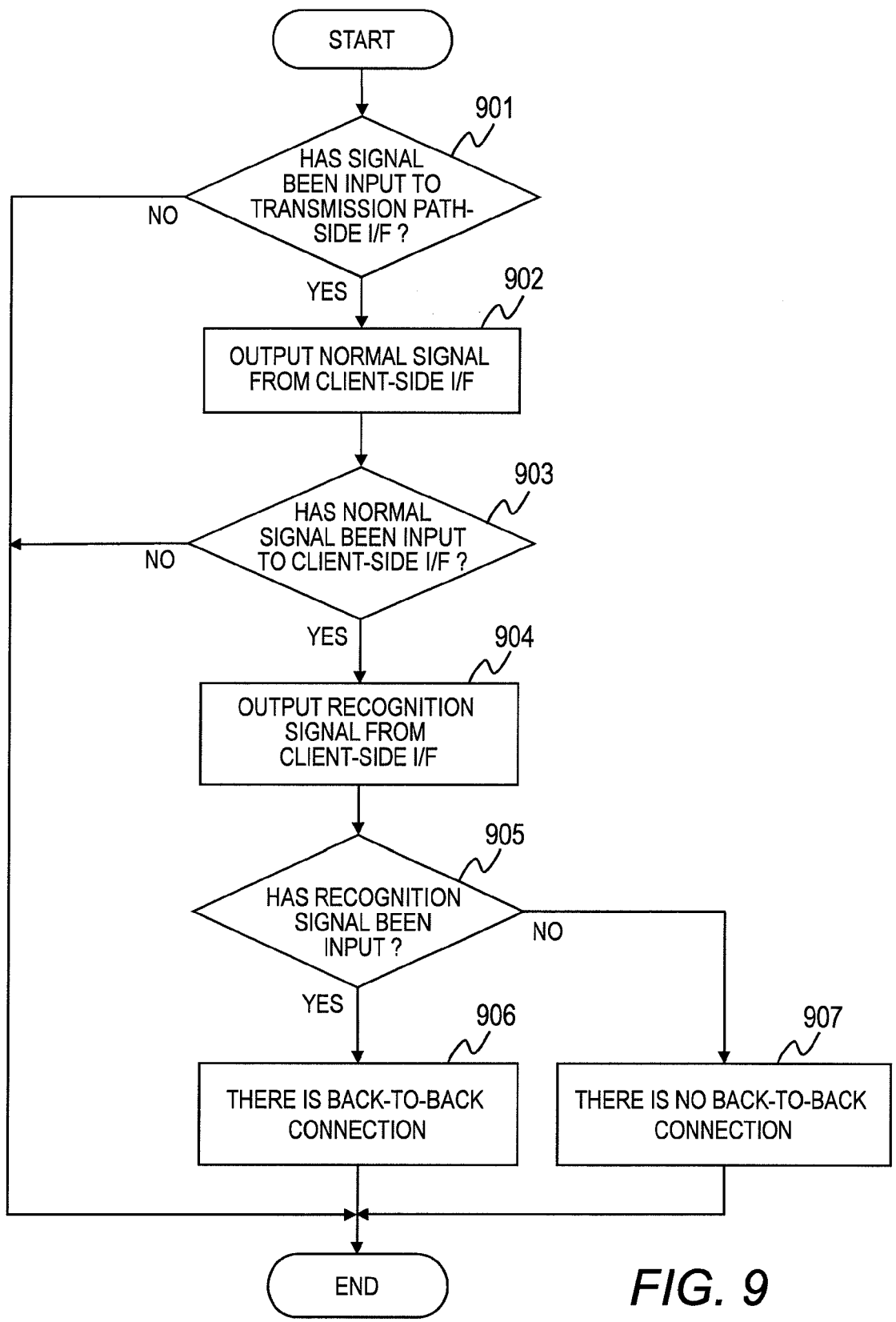
FIG. 9 is a flowchart of a connection determination process by a transponder according to the embodiment of this invention.
Figure 10:
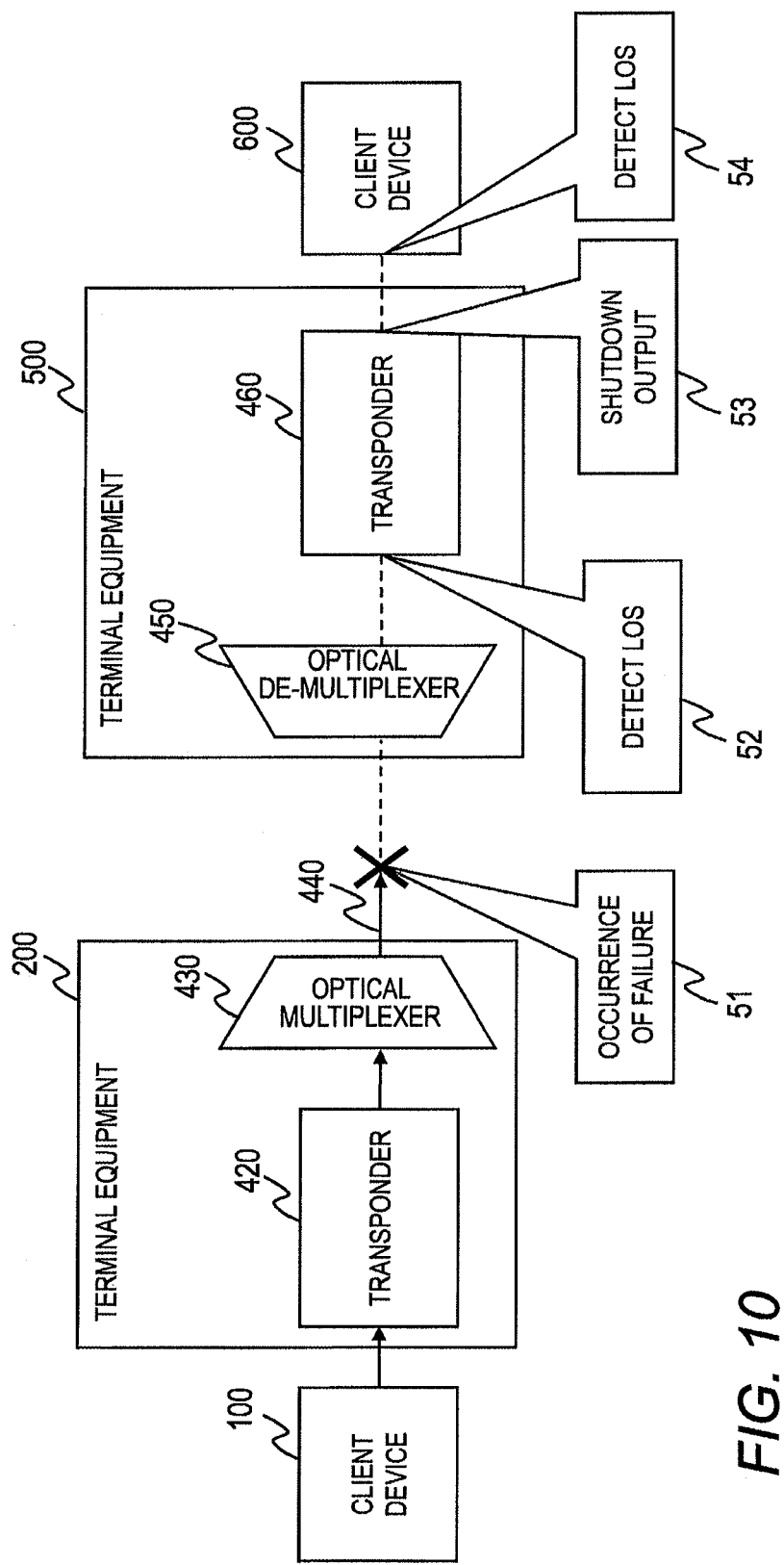
FIG. 10 is an explanatory diagram of a failure notification method in a case where a failure has occurred in a transmission path in a conventional example.
Figure 11:
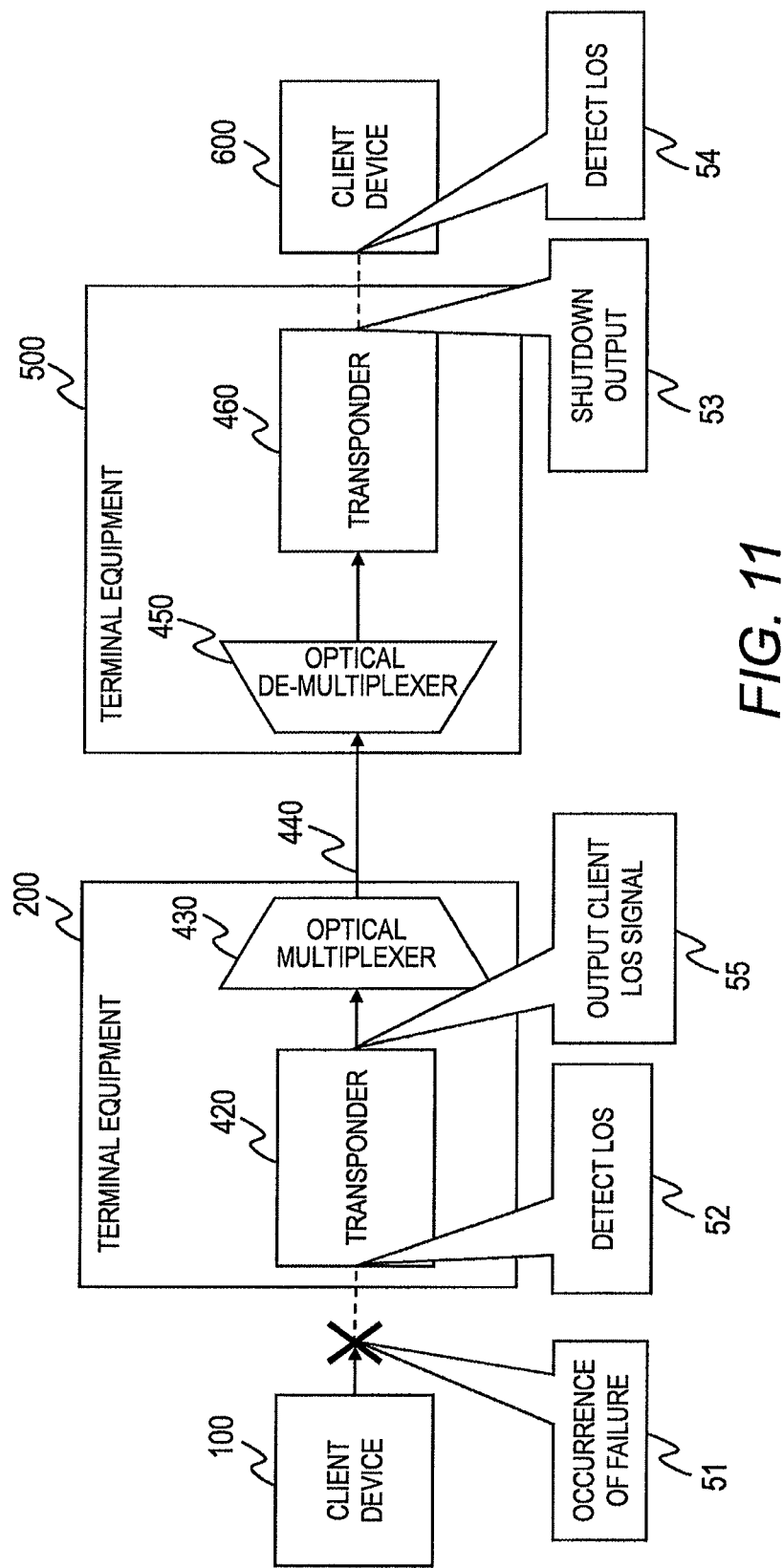
FIG. 11 is an explanatory diagram of a failure notification method in a case where a failure has occurred between a client device and a terminal equipment in a conventional example.
Figure 12:
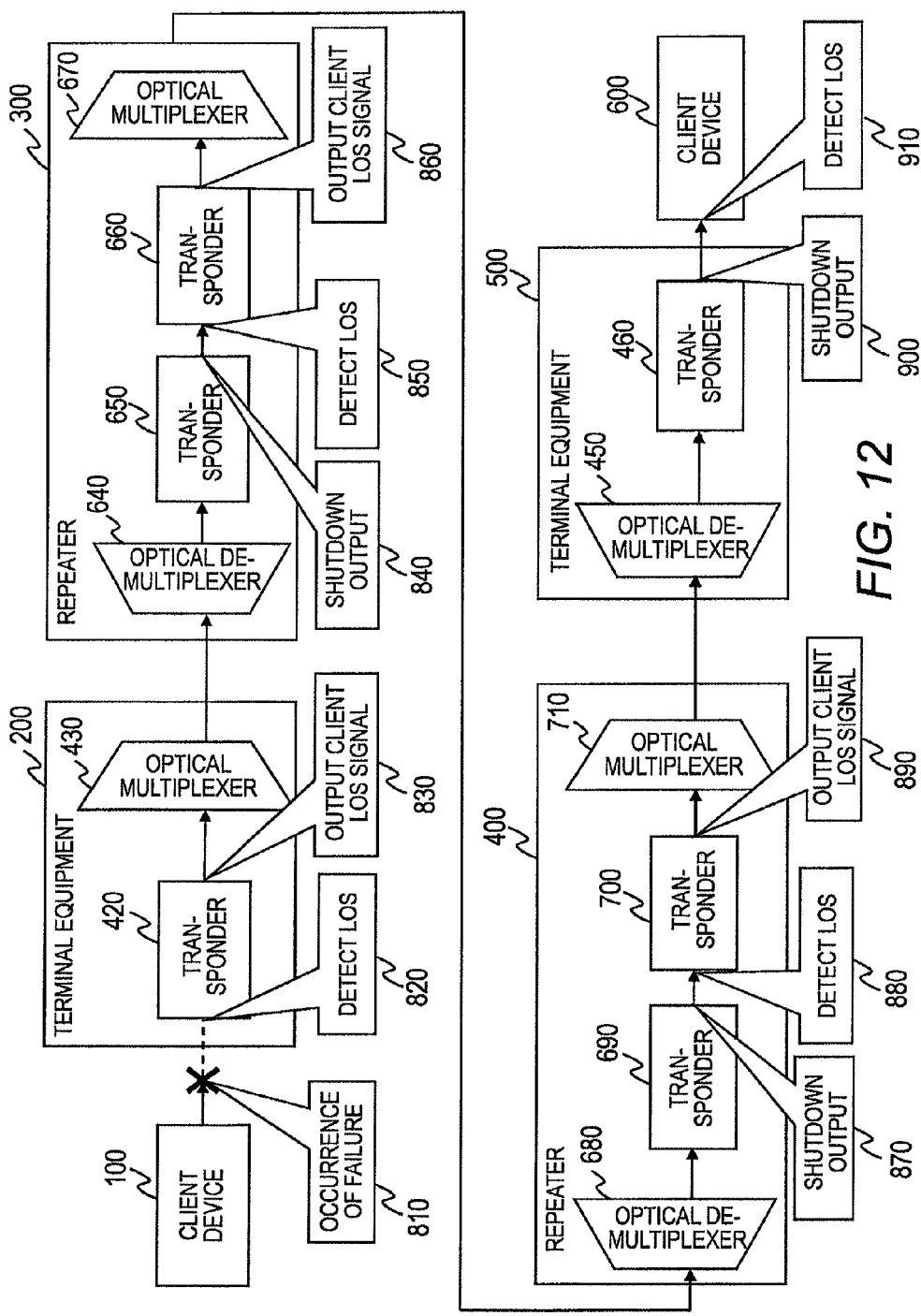
FIG. 12 is an explanatory diagram of a failure notification method in a multi-stage transmission system of a conventional example.

FIG. 9 is a flowchart of a connection determination process by the transponder of the embodiment of this invention.

The connection determination process is performed at a predetermined timing for a predetermined period of time after power-on by the control circuit 96 provided in the transponder.

First, the control circuit 96 determines whether or not some signal has been input to the transmission path-side interface (901).

When it is determined in the process of Step 901 that no signal has been input to the transmission path-side interface, the connection determination process is ended because no connection is established on the transmission path side.

On the other hand, when it is determined in the process of Step 901 that some signal has been input to the transmission path-side interface, the control circuit 96 outputs a normal signal from the client-side interface (902).

Next, the control circuit 96 determines whether or not the normal signal has been input to the client-side interface (903).

When it is determined in the process of Step 903 that the normal signal has not been input to the client-side interface, the connection determination process is ended because no connection is established on the client side.

On the other hand, when it is determined in the process of Step 903 that the normal signal has been input to the client-side interface, the control circuit 96 outputs a recognition signal from the client-side interface (904).

Next, the control circuit 96 determines whether or not a response signal with respect to the recognition signal output in the process of Step 904 has been input to the client-side interface (905).

When it is determined in the process of Step 905 that the recognition signal has been input to the client-side interface, it is determined that the connection is back-to-back connection (906) and the connection determination process is ended.

On the other hand, when it is determined in the process of Step 905 that the recognition signal has not been input to the client-side interface, it is determined that the connection is not back-to-back connection (907) and the connection determination process is ended.

It should be noted that, when the determination as to whether or not the connection is back-to-back connection has been made in the process of Step 906 or 907, the connection determination process is not repeated.

Further, in FIG. 9, whether or not the connection is back-to-back connection is determined based on whether or not the recognition signal has been input to the client-side interface. However, the control circuit 96 may determine that the connection is back-to-back connection when an ACK signal with respect to the recognition signal output in the process of Step 904 has been input, and may determine that the connection is not back-to-back connection when the ACK signal has not been input.

Although the notification of a failure occurring on the upstream side of the transponder has been described in this embodiment, a state (including a failure) as well as a failure on the upstream side of the transponder may be notified. In this case, the client LOS signal and the client LOS transmission signal illustrated in FIG. 7 become state signals.

As described above, in this embodiment, the transponder outputs a recognition signal from the client-side interface and determines whether or not connection is back-to-back connection based on the recognition signal. Then, if the connection is back-to-back connection, when a state signal is input from the transmission path-side interface, a transmission signal is output from the client-side interface, and the output of the client-side interface is stopped if the connection is not back-to-back connection.

Thus, the transponders in the repeater and the terminal equipment can be used in common, and the output of an unnecessary client LOS signal can be prevented, which facilitates the identification of a failure point.

While the present invention has been described in detail and pictorially in the accompanying drawings, the present invention is not limited to such detail but covers various obvious modifications and equivalent arrangements, which fall within the purview of the appended claims.

What is claimed is:

1. A transponder for performing bidirectional conversion between a client-side signal used for communication to a client device and a transmission path-side signal used for communication to a transmission path,
the transponder comprising:
a client-side interface for inputting and outputting the client-side signal, which is coupled to one of another client-side interface and the client device;
a transmission path-side interface for inputting and outputting the transmission path-side signal;
a connection determining unit for determining which of the another client-side interface and the client device is coupled to the client-side interface; and
a transmission signal generating unit for outputting, in a case where a state signal indicating a state on a transmission path side is input to the transmission path-side interface, a transmission signal indicating that the state signal has been input, from the client-side interface, wherein:
the connection determining unit has a recognition signal output unit for outputting, from the client-side interface, a recognition signal for determining that the another client-side interface is coupled to the client-side interface;
the connection determining unit determines that the another client interface is coupled to the client-side interface in a case where the recognition signal is input to the client-side interface; and
the transmission signal generating unit changes a form of the transmission signal to be output from the client-side interface, based on a determination result obtained by the connection determining unit.

2. The transponder according to claim 1, wherein:
in a case where the connection determining unit determines that the another client-side interface is coupled to the client-side interface, the transmission signal generating unit outputs the transmission signal from the client-side interface; and
in a case where the connection determining unit determines that the client device is coupled to the client-side interface, the transmission signal generating unit stops an output of a signal from the client-side interface.

3. The transponder according to claim 2, wherein the state signal includes a failure signal indicating that a failure has occurred on the transmission path side.

4. The transponder according to claim 1, wherein:
the recognition signal output unit determines that connection to the transmission path is established in a case where some signal is input to the transmission path-side interface;
the recognition signal output unit outputs a predetermined signal different from the recognition signal from the client-side interface in a case where the recognition signal output unit determines that the connection to the transmission path is established; and
the recognition signal output unit outputs the recognition signal in a case where the recognition signal output unit determines that the connection to the transmission path is established and in a case where a predetermined signal is input to the client-side interface.

5. The transponder according to claim 1, wherein:
the connection determining unit has a response signal generating unit for outputting, in a case where the recognition signal is input to the client-side interface, a response signal with respect to the recognition signal from the client-side interface; and
the connection determining unit determines that the another client-side interface is coupled to the client-side interface in a case where the response signal with respect to the recognition signal is input to the client-side interface.

6. A repeater for relaying two transmission paths used for communication of two opposing client devices,
the repeater comprising a first transponder coupled to one of the two transmission paths and a second transponder coupled to another one of the two transmission paths, wherein:
the first transponder and the second transponder perform bidirectional conversion between a client-side signal used for communication to the client device and a transmission path-side signal used for communication to the transmission path;
each of the first transponder and the second transponder has a client-side interface for inputting and outputting the client-side signal and a transmission path-side interface for inputting and outputting the transmission path-side signal;
the client-side interface is coupled to one of another client-side interface and the client device;
the client-side interface of the first transponder and the client-side interface of the second transponder are coupled to each other, the one of the two transmission paths is coupled to the transmission path-side interface of the first transponder, and the another one of the two transmission paths is coupled to the transmission path-side interface of the second transponder;

each of the first transponder and the second transponder further has:
- a connection determining unit for determining which of the another client-side interface and the client device is coupled to the client-side interface; and
- a transmission signal generating unit for outputting, in a case where a state signal indicating a state on a transmission path side is input to the transmission path-side interface of one of the first transponder and the second transponder, a transmission signal indicating that the state signal has been input, from the client-side interface of the one of the first transponder and the second transponder;

the transmission signal generating unit outputs the transmission signal from the client-side interface in a case where the connection determining unit determines that the another client-side interface is coupled to the client-side interface;

the transmission signal generating unit stops an output of a signal from the client-side interface in a case where the connection determining unit determines that the client device is coupled to the client-side interface;

the connection determining unit of the each of the first transponder and the second transponder determines that the another client-side interface is coupled to the client-side interface;

the transmission signal generating unit of the one of the first transponder and the second transponder in which the state signal is input to the transmission path-side interface outputs the transmission signal from the client-side interface to the client-side interface of the another one of the first transponder and the second transponder; and the another one of the first transponder and the second transponder outputs the state signal from the transmission path-side interface in a case where the transmission signal is input to the client-side interface.

7. The repeater according to claim 6, wherein the state signal includes a failure signal indicating that a failure has occurred on the transmission path side.

8. The repeater according to claim 6, wherein:
the connection determining unit has a recognition signal output unit for outputting, from the client-side interface, a recognition signal for determining that the another client-side interface is coupled to the client-side interface;

the connection determining unit determines that the another client interface is coupled to the client-side interface in a case where the recognition signal is input to the client-side interface;

the recognition signal output unit determines that connection to the transmission path is established in a case where some signal is input to the transmission path-side interface;

the recognition signal output unit outputs a predetermined signal different from the recognition signal from the client-side interface in a case where the recognition signal output unit determines that the connection to the transmission path is established; and the recognition signal output unit outputs the recognition signal in a case where the recognition signal output unit determines that the connection to the transmission path is established and in a case where a predetermined signal is input to the client-side interface.

9. The repeater according to claim 6, wherein:
the connection determining unit has a response signal generating unit for outputting, in a case where the recognition signal is input to the client-side interface, a response signal with respect to the recognition signal from the client-side interface; and the connection determining unit determines that the another client-side interface is coupled to the client-side interface in a case where the output response signal with respect to the recognition signal is input to the client-side interface.

10. Terminal equipment to be coupled to a client device and a transmission path,
the terminal equipment comprising a transponder for performing bidirectional conversion between a client-side signal used for communication to the client device and a transmission path-side signal used for communication to the transmission path, wherein:

the transponder has a client-side interface for inputting and outputting the client-side signal and a transmission path-side interface for inputting and outputting the transmission path-side signal;

the client-side interface is coupled to one of another client-side interface and the client device;

the client device is coupled to the client-side interface, and the transmission path is coupled to the transmission path interface;

the transponder further has:
- a connection determining unit for determining which of the another client-side interface and the client device is coupled to the client-side interface; and
- a transmission signal generating unit for outputting, in a case where a state signal indicating a state on a transmission path side is input to the transmission path-side interface, a transmission signal indicating that the state signal has been input, from the client-side interface;

the transmission signal generating unit outputs the transmission signal from the client-side interface in a case where the connection determining unit determines that the another client-side interface is coupled to the client-side interface;

the transmission signal generating unit stops an output of a signal from the client-side interface in case where the connection determining unit determines that the client device is coupled to the client-side interface; and the transmission signal generating unit stops the output of the signal from the client-side interface in a case where the connection determining unit determines that the client device is not coupled to the client-side interface and in a case where the state signal is input to the transmission path-side interface.

11. The terminal equipment according to claim 10, wherein the state signal includes a failure signal indicating that a failure has occurred on the transmission path side.

12. The terminal equipment according to claim 10, wherein:
the connection determining unit has a recognition signal output unit for outputting, from the client-side interface, a recognition signal for determining that the another client-side interface is coupled to the client-side interface;

the connection determining unit determines that the another client interface is coupled to the client-side interface in a case where the recognition signal is input to the client-side interface;

the recognition signal output unit determines that connection to the transmission path is established in a case where some signal is input to the transmission path-side interface;

the recognition signal output unit outputs a predetermined signal different from the recognition signal from the client-side interface in a case where the recognition signal output unit determines that the connection to the transmission path is established; and the recognition signal output unit outputs the recognition signal in a case where the recognition signal output unit determines that the connection to the transmission path is established and in a case where a predetermined signal is input to the client-side interface.

* * * * *